UNITED STATES PATENT OFFICE.

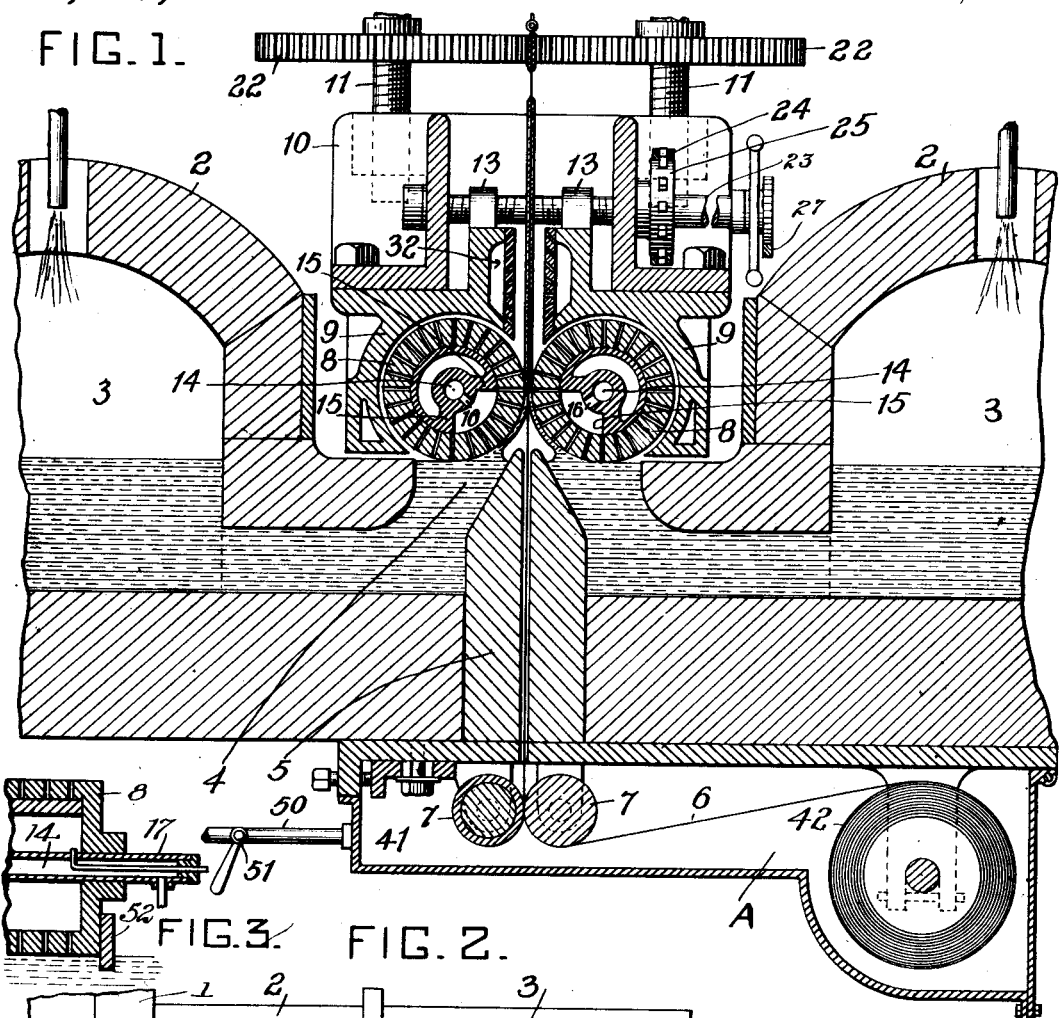

FRANK L. O. WADSWORTH, OF SEWICKLEY, PENNSYLVANIA.

MANUFACTURE OF GLASS SHEETS.

1,119,328.  Specification of Letters Patent.  Patented Dec. 1, 1914.

Application filed March 12, 1908. Serial No. 420,647.

*To all whom it may concern:*

Be it known that I, FRANK L. O. WADSWORTH, residing at Sewickley, in the county of Allegheny and State of Pennsylvania, a citizen of the United States, have invented or discovered certain new and useful Improvements in the Manufacture of Glass Sheets, of which improvement the following is a specification.

It is the object of the invention to form sheets of glass by causing the latter to adhere to a surface or surfaces moving in contact with and then away from the surface of a body of plastic glass.

The invention is hereinafter more fully described and claimed.

In the accompanying drawings forming a part of this specification Figure 1 is a sectional elevation of apparatus adapted to the practice of my invention; Fig. 2 is a top plan view of the same; and Fig. 3 is a detail.

The apparatus shown in the drawings is illustrated as employed for the manufacture of glass sheets having a metallic reinforce embedded therein, but it will be understood that the apparatus and the method employed may be used equally well for the manufacture of plain sheets of glass.

The melting furnace 1 is preferably constructed with forehearths 2 arranged in pairs and provided with channels 3 therein for conducting the glass to opposite sides of the drawing pot or receptacle 4. This pot or receptacle and the sheet forming apparatus are so arranged with reference to the furnace that the sheet will be formed in a plane at or approximately at right angles to the adjacent wall of the furnace, as shown in Fig. 2. When forming reinforced glass, a plug 5 having a slot therethrough is inserted through the bottom of the pot 4 so that its upper end will project above the surface of the glass. The reinforce 6 which is to be embedded in the finished sheet is fed either in sections or long lengths up through the driven rollers 7 and the slot. Rolls 8 are mounted in blocks 9 adjustably suspended from the frame 10 which in turn is adjustably suspended by screws 11 having their upper ends secured in suitable supports (not shown). The blocks 9 are shifted to move the rolls toward and from each other by screws having right and left hand threads and engaging threaded lugs 13 on the blocks. By the adjustment of the screws 11 the height of the rolls above the glass is controlled. The rolls, which are made hollow and have their shells perforated, are mounted on stationary hollow shafts 14 provided inside of the rolls with radially projecting wings 15* bearing at their edges on the inner peripheries of the rolls. These wings with the wall of the roll between them, form pockets connected by ports 16 with the passage in the shaft, which is connected by pipes 17 having valves 18 with a vacuum apparatus (not shown).

The rolls 8 may be adjusted in such relation to each other that the shortest distance between them will be equal to the desired thickness of the finished sheet. The shafts 14 are adjusted so that the vacuum chambers formed by the wings 15 will extend preferably from about the line of contact of the rolls with the glass to or approximately to the horizontal plane passing through the axes of the rolls. In order to keep the rolls cool the hollow portion outside the vacuum chambers may be filled with a circulating fluid.

The rolls 8 are rotated in opposite directions by a suitable motor 19 connected through gearing to the worm shaft 20 engaging worm wheels on the journals of the rolls 8. The feed rollers 7 are so connected by a belt or other suitable means to the motor, as to have a peripheral speed somewhat less than the peripheral speed of the rolls 8, so as to subject the wire mesh above these rollers to a constant tension as it enters the glass. The vertical adjustment of the rolls 8 is effected by the shaft 21 provided with worms engaging one of each pair of intermeshing wheels 22 secured to the screws 12. The screws 23 for adjusting the positions of the rolls 8 toward and from each other are shifted simultaneously by means of a chain 24 passing around sprocket wheels 25 on said screws. One of these screws is provided with a hand wheel 26 and also with a pinion 27 intermeshing with a rack 27ᵃ which is adapted to be shifted by a cam 28 at suitable predetermined intervals to move the rolls quickly toward each other to compress and thin the reinforced sheet, and back again to normal position.

Any suitable means may be employed for shifting the rack 27ᵃ by the cam 28, such for example as that shown, consisting of a bell crank 29 connected to the rack and also connected by a bar 30 to another bell crank 31 which is directly movable by the cam. If desired the layers of glass which go to form the sheet, may be thinned at the same intervals as the completed sheet is compressed by the rolls and to this end the valves 18 in the pipes leading to the vacuum chambers in the rolls may be connected to the rod 30 in such manner that said valve will be shifted to reduce the vacuum and thereby cause a lesser thickness of glass to adhere to the rolls, a short interval prior to the operation of the rack bar 27ª. Such interval of time between the change in vacuum and the operation of the rack bar being approximately equal to the time required for a given point on the periphery of the rolls 8 to move through an arc of approximately 90°.

The rollers 7 and the reel of wire 42 are inclosed in an air tight chamber A which can also be put into communication with the vacuum apparatus through a pipe 50 and regulating valve 51, and the triangular openings between the ends of the rolls 8 and the surface of the glass are closed at their ends by suitable blocks 52 of asbestos, or other suitable material, covering the ends of the rolls 8 and attached to the frame 9, as shown in Fig. 3.

In the manufacture of reinforced sheets by the apparatus shown in Figs. 1 and 2, the reinforce is passed up through the slot in the plug 5 and between the rolls 8 which are so adjusted that their peripheries will at least contact with the surface of the glass in the pot or receptacle 4. As a vacuum is established in the chambers formed by the wings 15, the layers of glass will be drawn up by the rolls in their rotation, the thickness of the layers being approximately proportional to the difference of pressure on their opposite faces. As these rolls rotate and draw the layers along with them the said layers are pressed together while their adjacent faces are in a plastic condition, against opposite sides of the reinforce and against each other, so that the two layers will weld or be merged one into the other as regards their contacting faces. As the upper wings 15 forming the vacuum chambers do not extend materially above the horizontal plane passing through the axes of these rolls, the vacuum will be destroyed as soon as the layers have been compressed together. As the layers or sheets can be formed quite rapidly, provision is made for cooling said sheets or layers as they leave the rolls 8. This cooling means may consist of chambers 32 having perforated walls and connected to a suitable source of air under pressure. As soon as the sheet has been started the valve 51 may be partially opened and the air removed in part from between the sheets thus facilitating their complete and perfect union by the combined effect of the roll pressure and the external atmospheric pressure.

In order to facilitate the division of the sheet continuously formed as described, provision is made as before stated for forcing the rolls in toward each other at predetermined intervals, by the operation of the cam 28 or by reducing the thickness of the layers drawn up by the rolls by reducing the vacuum in the chambers or by both methods operative simultaneously or at least in such sequence as is necessary to obtain the desired result. The adhesion of the glass to the rolls is sufficient to effect not only the formation of the layers as described, but also the upward movement of the completed sheet, but it is preferred to connect some lifting means to the upper end to maintain the sheet in a vertical position in case it should not have hardened sufficiently after passing beyond the rolls.

The rate of formation of sheets where the glass is drawn by a bait from molten glass is dependent upon the tenacity of the plastic glass in the direction of the pull. But in forming sheets by the movement of a forming surface to which the glass is caused to adhere, into contact with the glass and then away from the same, the rate of formation can be greatly accelerated. This rapid formation of the sheets is especially beneficial in manufacture of sheets having a reinforce embedded therein, as the layers can be brought into contact while their exposed surfaces are quite soft and plastic.

I claim herein as my invention:

1. The method of drawing glass in sheet form from a body of molten glass, which consists in rotating a roll with a portion of its surface in contact with said body, creating a vacuum between said body and the contacting portion of the roll-surface, maintaining such vacuum between the body and successive portions of the roll-surface moving away from said body and thereby causing a sheet of glass to be continuously drawn from said body in formative contact with said moving roll-surface, and progressively relieving the vacuum between the roll-surface and successively formed portions of the sheet.

2. The method of drawing glass from a body of molten glass, which consists in moving a forming surface into and out of contact with said body, creating a vacuum between said body and said forming surface, maintaining such vacuum as successive portions of the forming surface move away from said body and thereby causing the glass to be continuously drawn from said body in formative contact with said moving forming surface, and progressively relieving the vacuum between the forming surface and successively formed portions of the glass so drawn.

3. The method of drawing glass in sheet form from a body of molten glass, which consists in rotating a pair of coöperating rolls with a portion of the surface of each in contact with said body, creating a vacuum between said body and the contacting portions of the roll-surfaces, maintaining such vacuum between the body and successive portions of the roll-surfaces moving away from said body and thereby causing a layer of glass to be continuously drawn from said body in formative contact with each moving roll-surface, and compressing the layers together between the rolls and progressively relieving the vacuum as the layers are compressed together.

In testimony whereof I have hereunto set my hand.

F. L. O. WADSWORTH.

Witnesses:
CHARLES BARNETT,
FRANCIS J. TOMASSON.